United States Patent [19]

Waudoit

[11] 4,085,920

[45] Apr. 25, 1978

[54] PILOT CONTROL VALVE WITH SERVO MEANS

[75] Inventor: Claude A. Waudoit, Villers-la-Ville, Belgium

[73] Assignee: Caterpillar Tractor Co., Peoria, Ill.

[21] Appl. No.: 742,033

[22] Filed: Nov. 15, 1976

[51] Int. Cl.[2] .................... F16K 31/122; F15B 13/042

[52] U.S. Cl. ................................ 251/57; 137/625.63; 91/368

[58] Field of Search ...................... 137/625.63, 596.12, 137/596.15, 625.61; 91/460, 368; 251/57; 60/548, 588

[56] References Cited

U.S. PATENT DOCUMENTS

| | | | |
|---|---|---|---|
| 3,304,953 | 2/1967 | Wickline et al. | 251/57 |
| 3,340,897 | 9/1967 | Nevulis | 251/57 |
| 3,840,049 | 10/1974 | Field | 137/625.63 |

*Primary Examiner*—Martin P. Schwadron
*Assistant Examiner*—A. Michael Chambers
*Attorney, Agent, or Firm*—Phillips, Moore, Weissenberger, Lempio & Majestic

[57] ABSTRACT

The invention is concerned with an improvement in a valve system comprising a fluid operated main control valve and adjustable servo valve means for controlling the main valve, the main valve including a main valve spool reciprocal therewithin and a first and a second main valve chamber, one adjacent each end of the main valve spool. The improvement of the invention comprises an adjusting means operating via fluid displacement. Briefly, the improvement comprises means for moving the main valve spool responsive to a first fluid being flowed in to a first main valve chamber at a first end of the spool and at the same time being flowed out of a second main valve chamber at a second end of the spool. Also part of the improvement are servo valve means operating on pressure from a pressurized pilot fluid source for controlling the first fluid flow to and from the first and second main valve chambers. Further a part of the improvement of the invention is means for adjusting the servo valve means to control the movement of the main valve spool to a selected position.

10 Claims, 6 Drawing Figures

PILOT CONTROL VALVE WITH SERVO MEANS

BACKGROUND OF THE INVENTION

1. Field of the Invention

The invention is concerned with improvements in valve assemblies of the type wherein a movable valve element, for example a reciprocal spool, of a fluid flow regulating valve is displaced by a fluid medium. More particularly, the present invention is concerned with such a valve wherein movement of the reciprocal spool is controlled by displacement of fluid simultaneously on each end of the spool and without pressure being applied thereto. The fluid flow to and from each end of the valve spool is controlled by servo valve means operating off the servo valve pilot pressure fluid source. The present invention is particularly concerned with such a system wherein fluid displacement alone causes movement of the reciprocal spool of the main valve rather than pressure applied to the main valve.

2. Prior Art

It is known to control the pressure of fluid which displaces the spool of a fluid flow regulating valve by means of one or more pilot valves which can be hand actuated or remote-control actuated to select the pressure of fluid acting on the spool and hence to control the position of the spool relative to the body of the fluid flow regulating valve. In such systems, the regulating valve often employs a spring or added biasing means for urging the spool towards a neutral position.

It is an advantage of such valve assemblies that the pilot valve can be mounted at any desired distance from the fluid flow regulating valve. Also, the pilot valve can be adjusted to any one of a number of different positions to ensure that the pressure of fluid acting upon the spool of the fluid flow regulating valve can be accurately selected.

With many of the prior art valve assemblies the movement of the main spool in the regulating valve from the neutral position to other positions necessitates the application of substantial fluid pressure. Generally, a substantial fluid pressure must be applied to displace the spool to the extent which is necessary to cause the spool to reach an intermediate position. When the spool is to be caused to move beyond an intermediate position, it begins to establish or terminate the flow of fluid between one or more fluid admitting and/or discharging ports. The fluid pressure which is necessary to affect such displacement of the spool is a function of the deformation or stressing of the biasing means in the pilot valve. This deformation detracts from the overall deformation of the biasing means.

It would be advantageous if a servo valve actuated main valve was designed which was independent of fluid pressure. The present invention is particularly concerned with an improvement in a valve assembly which does not operate through application of pressure to the main spool valve and thus is completely free of the above-mentioned disadvantages.

SUMMARY OF THE INVENTION

Broadly, the invention is concerned with an improvement in a valve system comprising a fluid operated main control valve and adjustable servo valve means for controlling the main valve, the main valve including a main valve spool reciprocal therewithin. The improvement of the invention comprises adjusting means via fluid displacement. Briefly, the improvement comprises means for moving the main valve spool responsive to a first fluid being flowed into a first main valve chamber at a first end of the spool and at the same time being flowed out of a second main valve chamber at a second end of the spool. Also part of the improvement is servo valve means operating on pressure from a pressurized pilot fluid source for controlling the first fluid flow to and from the first and second main valve chambers and means for adjusting the servo valve means to control the movement of the main valve spool to a selected position.

It is an object of the present invention to provide an improved valve system wherein the main valve spool of a fluid flow regulating valve is displaced substantially fully by fluid displacement rather than by pressure being applied from a servo valve means thereto.

It is another object of the invention to provide servo valve means which operate to control fluid flow to and from a first chamber at one end of a spool of a main valve and to end from a second chamber at a second end of the spool of a main valve for use in a fluid flow regulating valve system.

It is a further object still of the present invention to provide an improvement in a fluid flow regulating valve control system as set out above which includes means for adjusting the servo valve means to control the movement of the main valve spool to a selected position.

It is another object yet of the invention to provide as part of the improvement of a fluid flow regulating valve as discussed in the previous objects, fluid make-up means whereby fluid is added to said first main valve chamber or said second main valve chamber from said pressurized pilot fluid source.

These and other objects of the invention, as will become apparent from reading the following specification, are accomplished as set out herein.

BRIEF DESCRIPTION OF THE DRAWINGS

The invention will be better understood by reference to the figures of the drawings wherein like numbers denote like parts throughout and wherein.

DETAILED DESCRIPTION OF THE PREFERRED EMBODIMENTS

Figure 1:
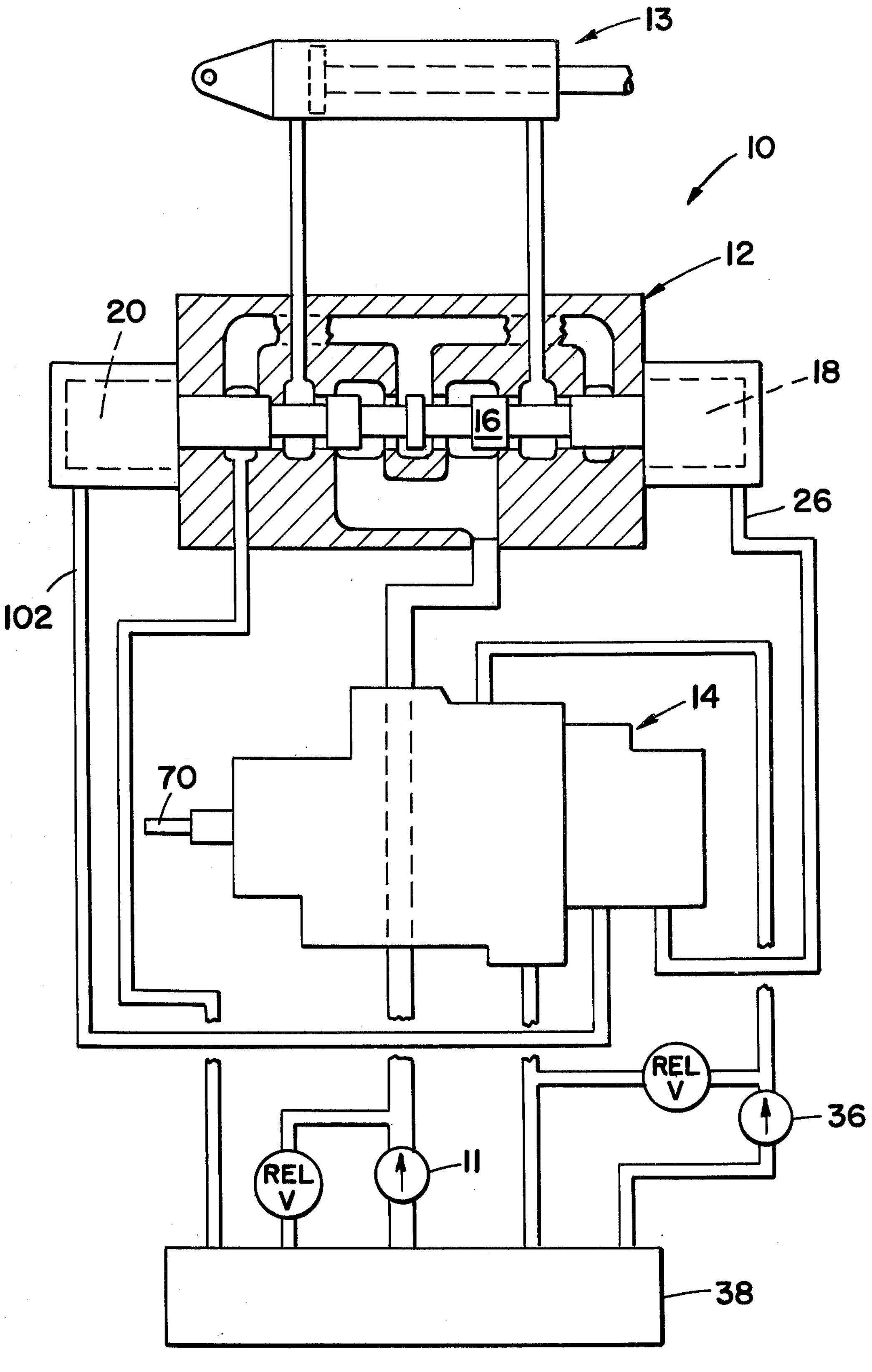
FIG. 1 illustrates, partially in side-elevation, partially in section, a hydraulic cylinder with a fluid regulating valve therefor and the improved servo valve control means of the present invention.
Figures 2, 3:
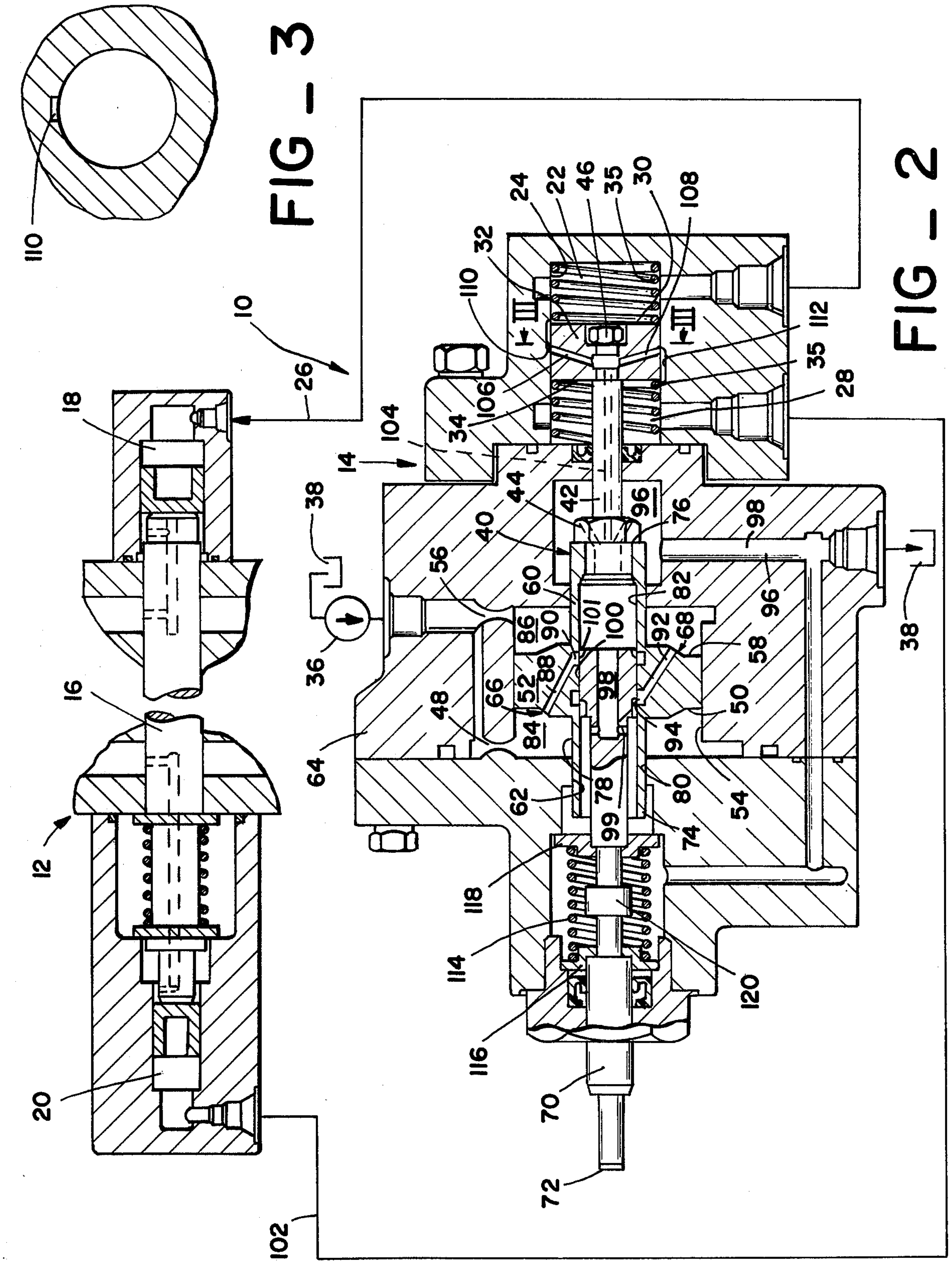
FIG. 2 illustrates in side elevation, and in section, a preferred embodiment of the improvement of the present invention.
FIG. 3 comprises a view taken along the line III—III of FIG. 2.
Figures 4, 5:
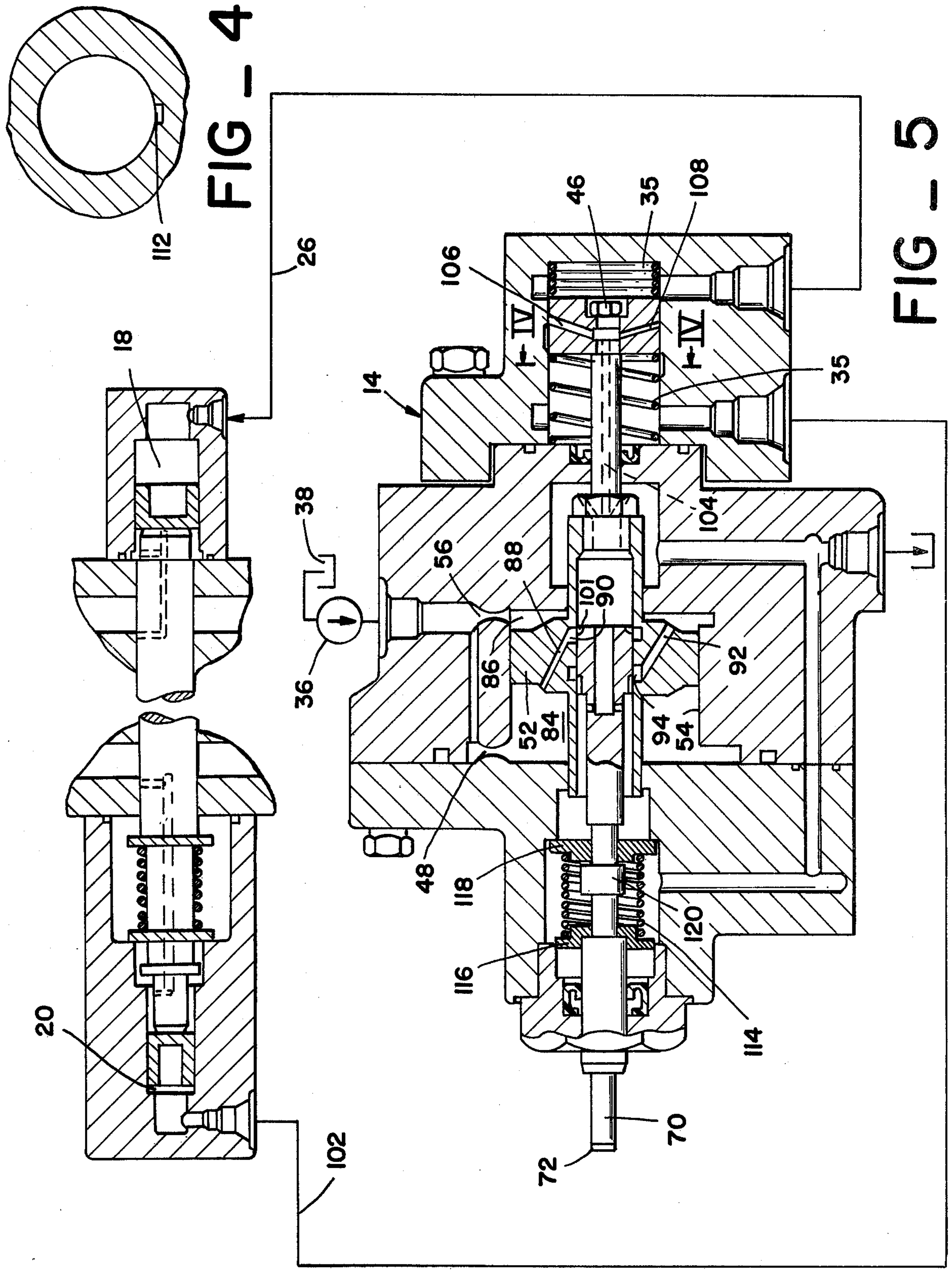
FIG. 4 comprises a view taken along the line IV—IV of FIG. 5.
FIG. 5 comprises a view similar to FIG. 1 but with the servo valve portion thereof shifted to cause adjustment of the main control valve.

Turning first to FIGS. 1, 2 and 5, there is illustrated therein a valve system 10 including a pump 11 and a main control valve 12 which controls fluid flow to and from a hydraulic cylinder 13 and servo valve means, namely a servo valve 14 for controlling the main valve 12. The main valve 12 includes a main valve spool 16 reciprocal therewithin. The details of the main control valve 12 are unimportant to the present invention other than those specific details discussed in the following. More particularly, any of a number of commercially-available main control valves 12 can be improved as set out herein through the use of the particular and unique fluid displacement operating servo valve means taught herein. U.S. Pat. No. 3,304,633, commonly assigned herewith, discloses just one of many such main control valves.

The main control valve 12 includes means for moving it responsive to a first fluid being flowed into a first main valve chamber 18 and at the same time being flowed out of a second main valve chamber 20 whereby the main valve spool 16 is moved solely by fluid (liquid) displacement and not by pressure being exerted thereupon. In the preferred embodiment of the invention as illustrated, the first chamber 18 and a first space 22 in the servo valve 14 in a sensing-adjusting bore 24 thereof comprise a first volume which generally also includes the volume of a first interconnecting conduit 26. A second volume is defined which comprises the volume of the second main valve chamber 20 along with the volume of a second space 28 within the sense-adjusting bore 24 with the first space 22 being on a first side 30 of a piston 32 and the second space 28 being on a second side 34 of the piston 32. A pair of springs 35 are generally provided one on each side of the piston 32 to help balance out transient vibrations. The piston 32 will be noted by reference to FIGS. 2 and 5 as slidably fitting reciprocally within the sensing-adjusting bore 24.

Servo valve means, particularly the servo valve 14, operates on pressure from the pressurized pilot fluid source, in particular a pilot pump 36 which pumps fluid from a sump 38. The servo valve 14 controls the flow of fluid to and from the first main valve chamber 18 and the second main valve chamber 20 as will be explained below. The servo valve means or system which serves for controlling the fluid displacement to and from said first main valve chamber 18 and said second main valve chamber 20 includes a pressure shiftable member 40, shifting of which responsively causes shifting of the piston 32. In the embodiment illustrated in FIGS. 2 and 5, a connector 42 provides positive connection between the piston 32 and the pressure shiftable member 40 by use of a nut 44 with appropriate fluid passage means therethough which screws into member 40 and nut means 46. The pressure shiftable member 40 has pressurized fluid from the pump 36 applied via a first pressure reducing means, generally a first restricted orifice 48, to a first side 50 of a flange 52, said flange 52 serving as an adjusting piston and slidably fitting within a control bore 54. Pressure is also supplied from the pump 36 via a second pressure reducing means, generally a second restricted orifice 56 to a second side 58 of the flange 52. The pressure shiftable member 40, as will be apparent from FIGS. 2 and 5, comprises the flange 52 extending outwardly from a sleeve 60 which fits within a hole 62 in a housing 64 of the servo valve 14. A first flow path 66 proceeds from the first side 50 of the flange 52 to the sump 38 and a second flow path 68 proceeds from the second side 58 of the flange 52 to the sump 38. The pressure shiftable member 40 shifts responsive to a pressure differential from the first side 50 of the flange 52 to the second side 58 of the flange 52, which pressure differential can be caused by restricting of a respective one of the first flow path 66 and the second flow path 68. The shifting of the shiftable member 40 leads to a reduction of the restriction and thereby reduces the pressure differential as the flange 52 approaches a new equilibrium position as shown for example in FIG. 5.

Restriction either of the first flow path 66 or the second flow path 68 can occur through movement of means for adjusting the servo valve means, more particularly by movement of a rod 70. The rod 70 is manually adjustable by applying pushing or pulling force adjacent a first end 72 thereof. The first end 72 of the rod 70 extends from the housing 64 to allow operator-initiated movement of the rod 70 within the hole 62. The sleeve 60 fits within the hole 62 with a first end 74 of the sleeve 60 opening towards the first end 72 of the rod 70 and a second end 76 of the sleeve 60 opening away from the first end 72 of the rod 70. The sleeve 60 has an exterior surface 78 which fits reciprocally against a control portion 80 of the hole 62 and an interior surface 82 against which the rod 70 reciprocally fits. As will be noted by reference to the figures, the flange 52 which proceeds outwardly from the sleeve 60 and more particularly outwardly from the exterior surface 78 thereof intermediate the first end 74 of the second end 76 thereof sits in reciprocating fit within the control bore 54, which control bore 54 is coaxial with the hole 62 and extends outwardly into the housing 64 from the control portion 80 of the hole 62. The flange 52 separates the control bore 54 into a first control chamber 84 adjacent the first side 50 of the flange 52 and into a second control chamber 86 adjacent the second side 58 of the flange 52. It will be noted that the first flow path 66 includes a first passageway 88 from the first control chamber 84 to a first position 90 of the interior surface 82 of the sleeve 60. The second flow path 68 likewise contains a second passageway 92 leading from the second control chamber 86 to a second position 94 on the interior surface 82 of the sleeve 60, the second position 94 being intermediate the first position 90 and the first end 74 of the sleeve 60. The first flow path 66 further includes a first passage 96 leading from the first position 90 to the sump 38. Further, the second flow path 68 includes a second passage 98 from the second position 94 on the interior surface 82 of the sleeve 60 as reached via a cross-bore 99 to the sump 38.

Means such as metering slots 101 are provided on the rod 70, most particularly the land 100, for partially increasing the restriction of a respective one of the first passage 96 and the second passage 98 while reducing the restriction of a respective other thereof so that the flange 52 experiences a pressure differential between the first control chamber 84 and the second control chamber 86, which pressure differential causes the flange 52 to move within the control bore 54 and which causes the sleeve 60 to move therewith within the hole 62 to reduce the pressure differential by partially increasing the restriction of the respective one of the first flow path 66 and the second flow path 68. It will be seen then that the land 100 and slots 101 of the rod 70 serves as flow path partial restriction or metering means movable relative to the pressure shiftable member 40 to temporarily partially increase or decrease the restriction of the respective one of the first flow path 66 and the second flow path 68 so that the pressure shiftable member 40 shifts causing movement of the piston 32, which in turn causes fluid to be displaced between the first main valve chamber 18 and the first space 22 and between the second main valve chamber 20 and the second space 28 thus controllably causing the main valve spool 16 to adjust. FIG. 5 illustrates the results of moving the rod 70 rightwardly as compared to FIG. 2.

The improvement of the present invention preferably includes means communicating a fluid volume from the servo valve 14 when the main valve spool 16 is at an equilibrium position and when it moves toward the second main valve chamber 20, and with the second main valve chamber 20 when the main valve spool 16 is at an equilibrium position and when it moves toward the first main valve chamber 18. In the embodiment illustrated, the communicating means comprises first fluid make-up means which communicate the pressure of the sump 38 with the first volume, comprising the volume of the first main chamber 18 plus the volume of the first space 22, and generally, the first interconnecting conduit 26, when the piston 32 is at an unshifted position, and when it moves to displace fluid from the first space 22 into the first main valve chamber 18. The communicating means further generally includes second fluid make-up means communicating the pressure of the sump 38 with the second volume comprising the second main control chamber 20 plus the second space 28 and a second connecting conduit 102 when the piston 32 is at an unshifted position and when it moves to displace fluid from the second space 28 into the second main valve chamber 20.

In the particular embodiment illustrated in FIGS. 2 and 5, the first and second fluid make-up means communicate via a tap 104 within the connector 42 with fluid at the pressure of sump 38 which has passed already through a respective one of the first passageway 88 and the second passageway 92. Referring to FIGS. 2, 3 and 4, it will be seen that the make-up pressure fluid from the tap 104 passes via a first side passage 106 to the first space 22 and via a second side passage 108 to the second space 28. A first undercut 110 allows flow from the side passage 106 into the first space 22 only when the piston 32 is unshifted. Similarly, a second undercut 112 allows flow of fluid from the second side passage 108 into the second space 28 only when the piston 32 is unshifted. Thus, fluid cannot be flowed into either of the first space 22 or the second space 28 in opposition to flow therein from the first chamber 18 and the the second chamber 20, respectively. When the piston 32 is at its unshifted position, flow can proceed simultaneously via both of the side passages 106 and 108 to the first undercut 110 and the second undercut 112 respectively. This assures that the fluid displacement portion of the system is constantly filled with fluid. As will be noted by reference to FIGS. 2 and 5, the first and second fluid make-up means each can flow-communicate with the fluid source intermediate the fluid path obstructor means, i.e. the land 100 on the rod 70, and the sump 38. This assures that fluid under pressure is not applied to either the first chamber 18 or the second chamber 20.

Referring now once again to FIGS. 2 and 5, it will be seen that in the preferred embodiment of the invention the rod 70 is biased as via a spring 114 acting against a first retainer 116 and a second retainer 118 into an intermediate location from which it is manually adjustable inwardly and outwardly relative to the hole 62 and to which location it returns under the impetus of the spring 114. The rod 70 further includes stop means which limits its inward and outward movement relative to the hole 62 to a predetermined distance. In the particular embodiment shown, the stop means comprises a stop flange 120, one side of which will contact the first retainer 116 if one pulls the rod 70 outwardly from the hole 62 and another side of which will contact the second retainer 118 if one attempts to push the rod 70 too far into the hole 62.

It should be noted that the improvement of the present invention and more particularly the improved servo valve 14 automatically adjust the small pressure surges which may occur within the main control valve 12. Thus, if instability is occuring within the main control valve 12, i.e. if the main control valve spool 16 is jerking back and forth a short distance, the change in displacement between the first chamber 18 and the first space 22 and between the second chamber 20 and the second space 28 will lead to a slight shifting of the flange 52 relative to the rod 70, which shifting will be counteracting as the flange 52 returns to its equilibrium (zero pressure differential) position just as when one manually moves the rod 70 and that, as this equilibrium position is returned to, the piston 32 will be returned to its corresponding position and hence the main control valve spool 16 will be maintained in its desired position.

ALTERNATE EMBODIMENT

Figure 6:
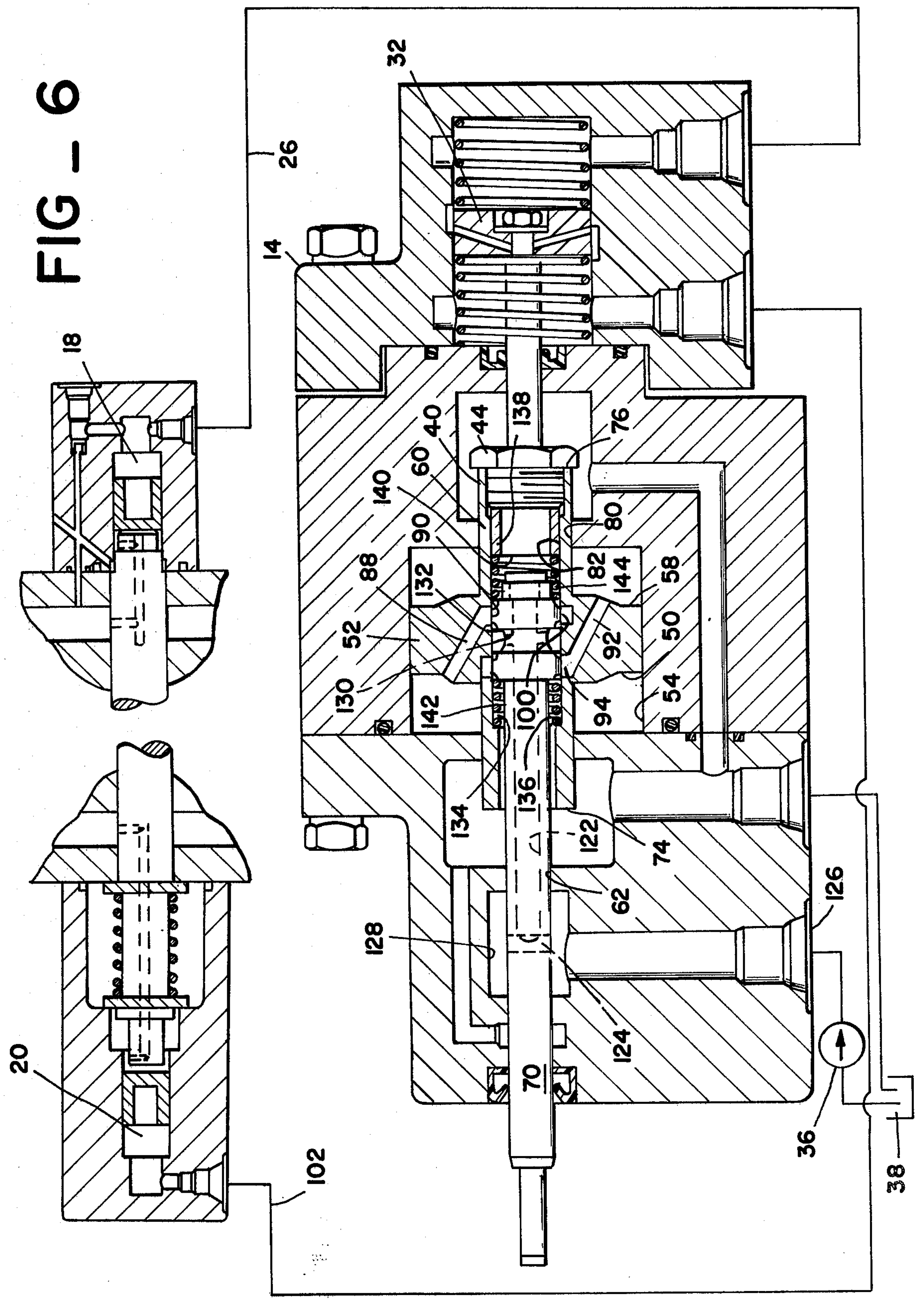
FIG. 6 illustrates an alternate embodiment of the present invention.

Turning now to FIG. 6, there is illustrated an alternate embodiment of the present invention, or more particularly an alternate embodiment of the servo valve 14, with the first interconnecting conduit 26 and the second interconnecting conduit 102 extending therefrom and used in the same manner as with respect to the embodiment illustrated in FIGS. 1–5. The embodiment illustrated in FIG. 6 differs from the embodiment illustrated in FIGS. 1–5 primarily in the method of introducing fluid from the pilot pump 36 and the control bore 54 on the first side 50 and the second side 58 of the flange 52. In the embodiment illustrated in FIG. 6, the rod 70 has an internal tunnel 122 longitudinally therein and a cross-bore 124 communicating with the tunnel 122. Fluid from the pilot pump 36 passes via a port 126 and an annulus 128 about the rod 70. The annulus 128 extends sufficiently along the length of the rod 70 so that fluid is always supplied to the cross-bore 124 and to the tunnel 122. A supply cross-bore 130 is formed in the rod 70 generally centrally of the land 100. The supply cross-bore 130 ends at an annulus 132 in the land 100 thus providing fluid from the pilot pump 36 at the annulus 132. If the rod 70 is shifted slightly rightwardly in FIG. 6 relative to the flange 52, it is clear that fluid from the pilot pump 36 will then flow along the first passageway 88 leading to the control bore 54 on the first side 50 of the flange 52. Thus, the overlap of the annulus 132 with the first position 90 on the interior surface 82 of the sleeve 60 will create a first pressure reducing means (a first restricted orifice) equivalent to the first restricted orifice 48 in FIGS. 1–5 through which pressure will be applied against the first side 50 of the flange 52. It is clear that at the same time that pressurized fluid is being flowed through the first passageway 88, fluid will be escaping via the second passageway 92 to the second position 94 on the interior surface 82 of the sleeve 60 and thence via an annular passage 134 between the sleeve 60 and the rod 70 intermediate its ends and thence to the sump 38. Because of the resulting overall pressure differential, the flange 52 will be forced to move rightwardly thus cutting off or at least significantly reducing flow thorugh the first passageway 88 and at the same time cutting off or at least significantly reducing flow through the second passageway 92.

Generally, the annulus 132 will slightly overlap both the first position 90 and the second position 94 on the interior surface 82 of the sleeve 60 and the second position 94 will normally overlap slightly the annular passage 134, as will the second position 94. In this manner, a small amount of fluid from the pilot pump 36 normally flows via the annulus 132 to each of the first position 90 and the second position 94 and thence to the annular passage 134 and finally to the sump 38. This allows a constant pressure relief for the fluid being pumped by the pilot pump 36. In the embodiment illustrated in FIG. 6, travel of the rod 70 is limited by the length of the annular passage 134 whereby the land 100 on the rod 70 is stopped in a leftward direction by first shoulder 136 formed in the annular passage 134 adjacent the first end 74 of the sleeve 60 and in its rightward movement is stopped by a spacer 138 which fits against the interior surface 82 of the sleeve 60 adjacent the second end 76 thereof to form a second shoulder 140. Means are provided for causing the rod 70 to be biased into an intermediate location from which it is manually adjustable inwardly and outwardly relative to the hole 62 and to which the rod 70 returns under the impetus of the biasing means. The biasing means used in the embodiment illustrated in FIG. 6 comprises a first spring 142 and a second spring 144 each within the sleeve 60, the spring 142 acting between the first shoulder 136 and the land 100 and the second spring 144 acting between the second shoulder 140 and the land 100 on the opposite side thereof.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains, and as may be applied to the essential features hereinbefore set forth, and as fall within the scope of the invention and the limits of the appended claims.

What is claimed is:

1. In a valve system comprising a fluid operated main control valve and adjustable servo valve means for controlling said main valve, said main valve including a main valve spool reciprocal therewithin, and improved adjusting means operating via fluid displacement, comprising:

a. means for moving said main valve spool responsive to a portion of a first fixed volume of fluid being flowed into a first main valve chamber at a first end of said spool and at the same time a portion of a second fixed volume of fluid being flowed out of a second main valve chamber at a second end of said spool;

b. servo valve means operating on pressure from a pressurized pilot source for controlling said first fluid flow to and from said first and second main valve chamber; and c. means for adjusting said servo valve means to control the movement of said main valve spool to a selected position.

2. An improvement as in claim 1, including:

a sump; and means for communicating said sump with said first main valve chamber and second main valve chamber.

3. In a valve system comprising a fluid operated main control valve and adjustable servo valve means for controlling said main valve, said main valve including a main valve spool reciprocal therewithin, an improved adjusting means operating via fluid displacement, comprising:

a fluid displacement system for moving said main valve spool, including a first fixed volume comprising, in fluid flow communication, a first main valve chamber at a first end of said main valve spool and a first space in a sensing-adjusting bore of said servo valve means on a first side of a piston which slidably fits within said sensing-adjusting bore, and a second fixed volume comprising, in fluid flow communication, a second main valve chamber at a second end of said main valve spool and a second space in said sensing-adjusting bore on a second side of said piston;

control system adjusting means;

a system for controlling said fluid displacement system, including a pressure shiftable member, shifting of which responsively causes shifting of said piston, said pressure shiftable member having pressurized fluid from a pressurized fluid source applied via a first restricted orifice to a first side thereof and via a second restricted orifice to a second side thereof and having a first flow path from said first side of said pressure shiftable member to a sump and a second flow path from said second side of said pressure shiftable member to said sump, said pressure shiftable member shifting responsive to a pressure differential from said first to said second side thereof caused by restricting of a respective one of said first and second flow paths to reduce said restricting and thereby reduce said pressure differential; and flow path restrictor means as a part of said control system adjusting means, said flow path restrictor means being movable relative to said member to temporarily restrict said respective one of said first and second flow paths so that said member shifts causing movement of said piston which in turn causes fluid to be displaced between said first main valve chamber and said first space and between said second main valve chamber and said second space to controllably cause said main valve spool to adjust.

4. An improvement as in claim 3, including:

a. first fluid make-up means communicating said sump with said first volume when said piston is unshifted; and b. second fluid make-up means communicating said sump with said second volume when said piston is unshifted.

5. An improvement as in claim 4, wherein said first and second fluid make-up means each flow-communicate with said sump.

6. In a valve system comprising a fluid operated main control valve and adjustable servo valve means for controlling said main valve, said main valve including a main valve spool reciprocal therewithin, an improved adjusting means operating via fluid displacement, comprising:

a servo valve housing having a hole therein and a rod movable within said hole, a first end of said rod extending from said housing to allow operator-initiated movement of said rod within said hole;

a sleeve within said hole, a first end of said sleeve opening towards said first end of said rod and a second end of said sleeve opening away from said first end of said rod, said sleeve having an exterior surface fitting reciprocally adjacent a control portion of said hole and an interior surface against which said rod reciprocally fits, said sleeve having a flange extending outwardly from the exterior surface thereof intermediate said first and second ends of said sleeve in reciprocating fit within a control bore coaxial with said hole and extending outwardly into said housing from said control portion of said hole, said flange separating said control bore into a first control chamber and a second control chamber;

a pressurized fluid source communicating via a first restricted orifice with said first control chamber and via a second restricted orifice with said second control chamber;

a first passageway from said first control chamber to a first position on the interior surface of said sleeve;

a second passageway from said second control chamber to a second position on the interior surface of said sleeve, said second position being intermediate said first position and said first end of said sleeve;

a first passage from said first position to a sump;

a second passage from said second position to said sump;

means on said rod for partially increasing the restriction of the respective one of said first and second passages while temporarily partially decreasing the restriction of a respective other thereof so that said flange experiences a pressure differential between said first control chamber and said second control chamber, said pressure differential causing said flange to move within said control bore and said sleeve to move therewith within said hole to reduce said pressure differential by reducing the temporary restriction of said respective one of said first and second passages;

a piston communicating with the second end of said sleeve, said piston being in reciprocating fit within a sensing-adjusting bore in said housing and separating said sensing-adjusting bore into a first space and a second space;

means flow-communicating said first space with said first main valve chamber, said first main valve chamber and said first space together comprising a first fixed volume; and means flow-communicating said second space with said second main valve chamber, said second main valve chamber and said second space together comprising a second fixed volume, so that as said piston moves to displace fluid from said first space into said first main valve chamber, said main valve spool moves to displace an equal volume of fluid from said second main valve chamber into said second space.

7. An improvement as in claim 6, including:

first fluid make-up means communicating said sump with said first volume when said piston is unshifted; and second fluid make-up means communicating said sump with said second volume when said piston is unshifted.

8. An improvement as in claim 7, wherein said first and second fluid make-up means each flow-communicate with said sump.

9. An improvement as in claim 8, including means biasing said rod into an intermediate location from which it is manually adjustable inwardly and outwardly relative to said hole and to which location it returns under the impetus of said biasing means.

10. An improvement as in claim 9, including stop means on said rod limiting its inward and outward movement relative to said hole to a predetermined distance.

* * * * *